(12) United States Patent
Piller et al.

(10) Patent No.: US 12,085,006 B2
(45) Date of Patent: Sep. 10, 2024

(54) CAP FOR A HEADER BOX

(71) Applicant: Valeo Systemes Thermiques, Le Mesnil-Saint-Denis (FR)

(72) Inventors: Garry Piller, Reims (FR); Stephane Potteau, Reims (FR); Jean-Jacques Garcia, Reims (FR); Damien Lecleire, Reims (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 812 days.

(21) Appl. No.: 17/256,779

(22) PCT Filed: Jul. 1, 2019

(86) PCT No.: PCT/FR2019/051621
§ 371 (c)(1),
(2) Date: Dec. 29, 2020

(87) PCT Pub. No.: WO2020/002861
PCT Pub. Date: Jan. 2, 2020

(65) Prior Publication Data
US 2021/0285359 A1    Sep. 16, 2021

(30) Foreign Application Priority Data

Jun. 29, 2018 (FR) ...................................... 1855925

(51) Int. Cl.
*F01P 11/02* (2006.01)
*F16L 55/07* (2006.01)
(Continued)

(52) U.S. Cl.
CPC ........... *F01P 11/0214* (2013.01); *F16L 55/07* (2013.01); *F16L 55/1125* (2013.01); *F28F 9/02* (2013.01);
(Continued)

(58) Field of Classification Search
CPC .. F01P 11/0214; F01P 2011/023; F16L 55/07; F28F 9/02; F28F 2265/18; F28F 2265/22
(Continued)

(56) References Cited

U.S. PATENT DOCUMENTS 2,144,584 A * 1/1939 Gleason ............... F01P 11/0214
                                                         220/293
4,205,707 A * 6/1980 Lundgren ............. F16L 57/005
                                                         138/96 T
(Continued)

FOREIGN PATENT DOCUMENTS

| FR | 2588367 A1 | 4/1987 |
| KR | 20110031821 A | 3/2011 |
| KR | 101549096 B1 | 9/2015 |

OTHER PUBLICATIONS

The First Office Action in corresponding Chinese Application No. 201980047275.1, dated Dec. 6, 2021 (10 pages).
(Continued)

*Primary Examiner* — David R Deal
(74) *Attorney, Agent, or Firm* — Osha Bergman Watanabe & Burton LLP

(57) ABSTRACT

A cap (20) for a header box of a heat exchanger (1), in particular for a motor vehicle, in particular a radiator, is disclosed. This cap includes a head (21), a shank (22) comprising at least one mounting thread (23), this shank being between the head and a free end of the cap, a retaining lug (30), in particular elastically deformable, arranged to retain the cap in an opening (10) of the header box in an intermediate position of the cap, in which position the cap leaves a clear passage while being retained in the opening, this retaining lug being formed on the shank.

11 Claims, 3 Drawing Sheets

Figure 1:
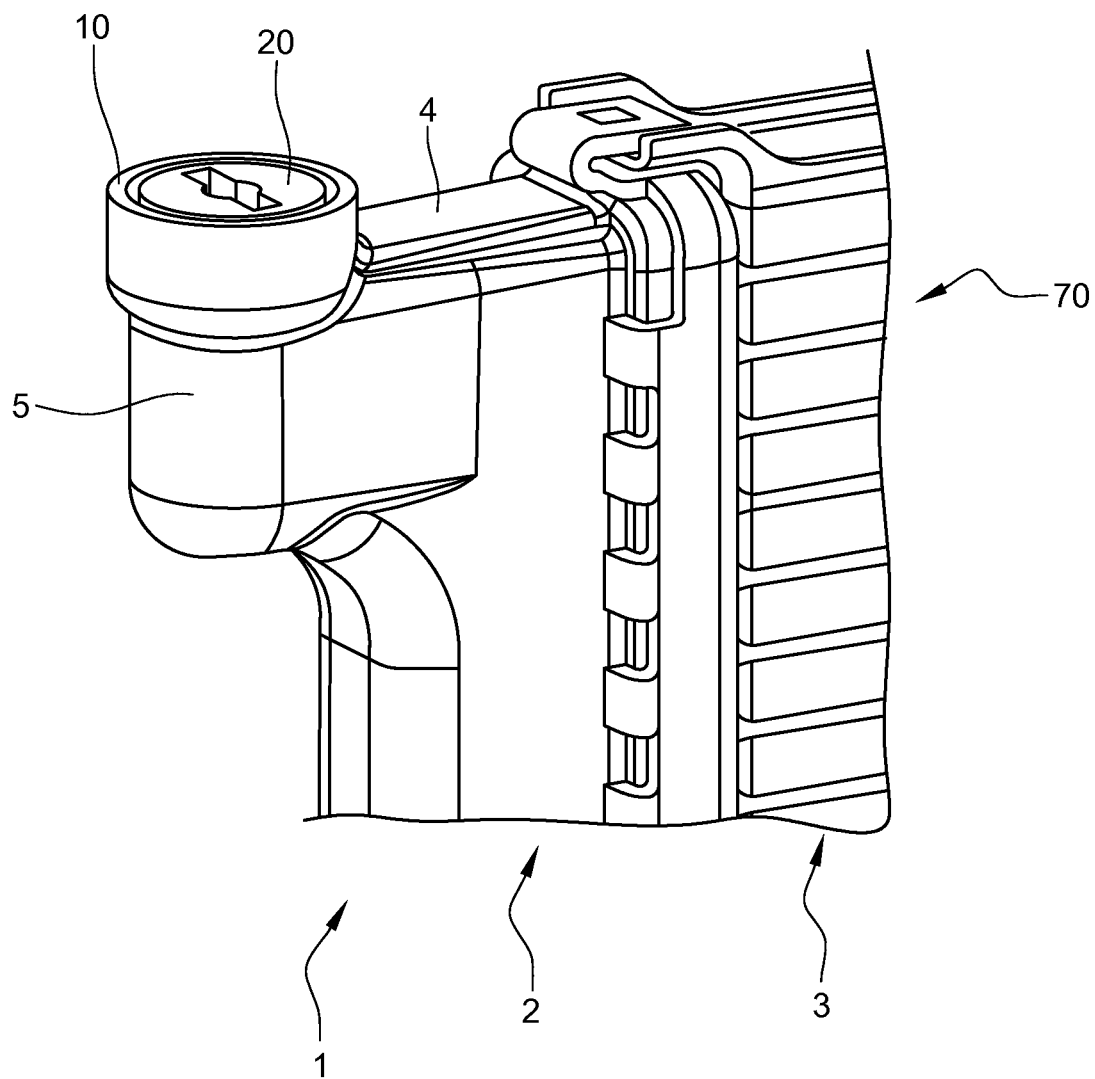

(51) Int. Cl.
  *F16L 55/11*   (2006.01)
  *F28F 9/02*    (2006.01)
(52) U.S. Cl.
  CPC ... *F01P 2011/0233* (2013.01); *F28F 2265/18* (2013.01); *F28F 2265/22* (2013.01)
(58) Field of Classification Search
  USPC .......................................................... 138/89
  See application file for complete search history.

(56)          References Cited

U.S. PATENT DOCUMENTS

| | | | |
|---|---|---|---|
| 4,717,119 A | | 1/1988 | Trin |
| 4,729,488 A | * | 3/1988 | Bullock, III ........... B65D 41/32 |
| | | | 220/276 |
| 5,071,020 A | * | 12/1991 | Reutter ................ F01P 11/0214 |
| | | | 220/301 |
| 5,096,158 A | | 3/1992 | Burdick et al. |
| 5,620,427 A | * | 4/1997 | Werschmidt ....... A61M 39/1011 |
| | | | 137/516.13 |
| 5,722,451 A | | 3/1998 | Godeau et al. |
| 6,619,380 B1 | | 9/2003 | Hartman et al. |
| 9,399,125 B2 | * | 7/2016 | Burkholz .............. A61M 39/20 |
| 9,827,380 B2 | * | 11/2017 | Karlsson .............. A61M 5/2466 |
| 2008/0000724 A1 | | 1/2008 | Stlaske et al. |
| 2016/0084386 A1 | * | 3/2016 | Farlow ................... F16K 31/50 |
| | | | 251/264 |
| 2016/0121097 A1 | * | 5/2016 | Steele ................. F16L 55/1152 |
| | | | 29/428 |

OTHER PUBLICATIONS

International Search Report and Written Opinion in corresponding International Application No. PCT/FR2019/051621, mailed Oct. 22, 2019 (14 pages).

* cited by examiner

CAP FOR A HEADER BOX

The invention relates in particular to a cap for a header box of a heat exchanger.

A heat exchanger, for example a motor vehicle radiator, generally comprises at least one water box, or header box, mounted at the end of a bundle of tubes in which a fluid circulates, for example the coolant of a motor vehicle internal combustion engine. It is known practice to form an orifice or opening in the wall of the water box and close this orifice by means of a cap including an operating head, an intermediate portion on which a seal is mounted, and a shank formed with radial ribs that make up threads interacting with complementary threads on the edge of the orifice of the water box, for mounting the cap in the orifice and holding it in the sealed closed position of the orifice.

In order to purge or drain the exchanger, the cap is rotated, for example by a quarter-turn, from this closed position. It must then be pulled outwards, by translation along its axis, to perform the purging or draining of the exchanger. This latter operation is not necessarily obvious to an inexperienced person.

FR2588367 describes such a cap.

Such an existing cap has the following drawbacks.

This cap is too bulky to be fitted in new water boxes. Manufacturers tend to request that space be saved in the engine compartment, and that increasingly compact cooling units be provided, which means radiator boxes with increasingly small widths.

In addition, it is not always possible to fit in a hand to insert a cap that is screwed in manually.

Furthermore, it is common to add a degassing function to exchangers, in particular radiators, to allow the air to escape during filling with water/glycol or other heat transfer fluid. Currently, either a degassing cap or a degassing tube is used to degas the radiator.

This cap must be clipped on by hand and there is not always sufficient access to the engine compartment to fit a hand in. This is a problem.

In addition, on some applications, it is imperative that the cap be prevented from escaping or jumping out when it is opened for draining or degassing, that is, the cap is retained in the opening or orifice while remaining open.

The invention aims to overcome at least some of the drawbacks or requirements listed above.

The invention thus relates to a cap for a header box of a heat exchanger, in particular for a motor vehicle, in particular a radiator, this cap including:
- a head,
- a shank comprising at least one mounting thread, this shank being between the head and a free end of the cap,
- a retaining lug, in particular elastically deformable, arranged to retain the cap in an opening of the header box in an intermediate position of the cap, in which position the cap leaves a clear passage while being retained in the opening, this retaining lug being formed on the shank.

According to the invention, this retaining lug makes it possible to retain the cap, which is particularly advantageous when the environment of the vehicle surrounding the exchanger does not make it possible to operate the cap easily, especially if there is a lack of space to fit a hand in.

According to one aspect of the invention, the retaining lug is elastically deformable so that it can adopt a retained position and a released position allowing the cap be moved in the opening of the header box when the cap is put in place.

According to one aspect of the invention, the retaining lug is arranged closer to the free end of the cap than to the head.

According to one aspect of the invention, the retaining lug is arranged on the lower half of the shank, on the side of the free end.

According to one aspect of the invention, the cap has a longitudinal axis, and the retaining lug includes a side wall preferably inclined relative to this longitudinal axis, in particular at an angle of between 30° and 60°, in particular approximately 45°. This side wall in particular has a helical profile.

According to one aspect of the invention, the lug includes a bearing flange arranged to press against an axial stop of the opening of the header box.

According to one aspect of the invention, the flange is connected to the side wall in particular at an angle of between 90° and 180°, in particular between 100° and 160°.

According to one aspect of the invention, the retaining lug is connected to a base, in particular arc-shaped, of the shank.

According to one aspect of the invention, the retaining lug is adjacent to a thread of the shank.

According to one aspect of the invention, the retaining lug is integrally formed with the shank, in particular by molding.

According to one aspect of the invention, the retaining lug is singular, and is only present on one side of the shank.

According to one aspect of the invention, the shank includes at least one thread situated between the retaining lug and the head when the cap is viewed from the side.

According to one aspect of the invention, the thread includes a substantially helical side wall arranged to allow the mounting, in particular by a quarter-turn, of the cap in an opening of the header box.

According to one aspect of the invention, the thread includes a rotational locking pin arranged to interact with a stop of the header box in order to prevent the cap from rotating when it is in the intermediate position.

According to one aspect of the invention, the locking pin is facing towards the free end of the cap.

According to one aspect of the invention, the cap includes a seal mounted under the head.

According to one aspect of the invention, the shank includes a retaining plate arranged to accommodate the seal, in particular an O-ring, between this plate and the head.

According to one aspect of the invention, the retaining plate and the shank are integrally formed, in particular from a plastic material.

According to one aspect of the invention, the head, the shank and the plate are integrally formed, in particular from a plastic material.

According to one aspect of the invention, the head includes a slot arranged to receive a screwdriver in order to turn the cap.

According to one aspect of the invention, the slot has an elongated shape.

The invention further relates to a heat exchanger including a header box provided with an opening, and a cap according to the invention, the cap being mounted in the opening.

According to one aspect of the invention, the opening includes one or more radial protrusions, one of the protrusions defining an axial stop for the retaining lug.

According to one aspect of the invention, there are two radial protrusions, in particular substantially diametrically opposite each other.

According to one embodiment of the invention, the heat exchanger, in particular a radiator, for example a lowtemperature radiator, is provided with a degassing function to allow the air to escape during filling with water/glycol or other heat transfer fluid.

The invention will be better understood and further details, features and advantages of the invention will become apparent on reading the following description, which is given by way of non-limiting example with reference to the appended drawings, in which:

FIGS. 1 to 5 schematically and partially illustrate, in various views, a heat exchanger according to one embodiment of the invention.

FIG. 1 shows a heat exchanger 1, in this case a motor vehicle radiator, including a water box or header box 2.

The box 2 is mounted conventionally at the end of a tube bundle 3.

The top wall 4 is formed by molding with a degassing duct 5 comprising a cylindrical opening 10 formed adjacent to the top wall 4.

The inner edge of the opening 10 comprises radial protrusions 11.

The header box 2 is in fluid communication with the tubes of the bundle 3, in a manner known per se.

Figure 2:
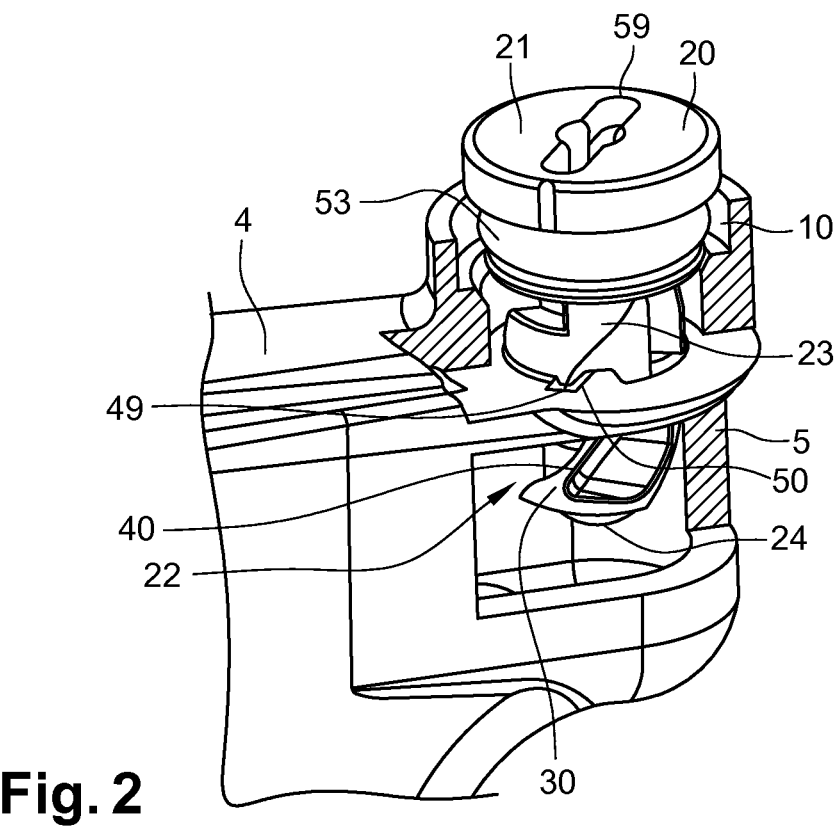
Figure 3:
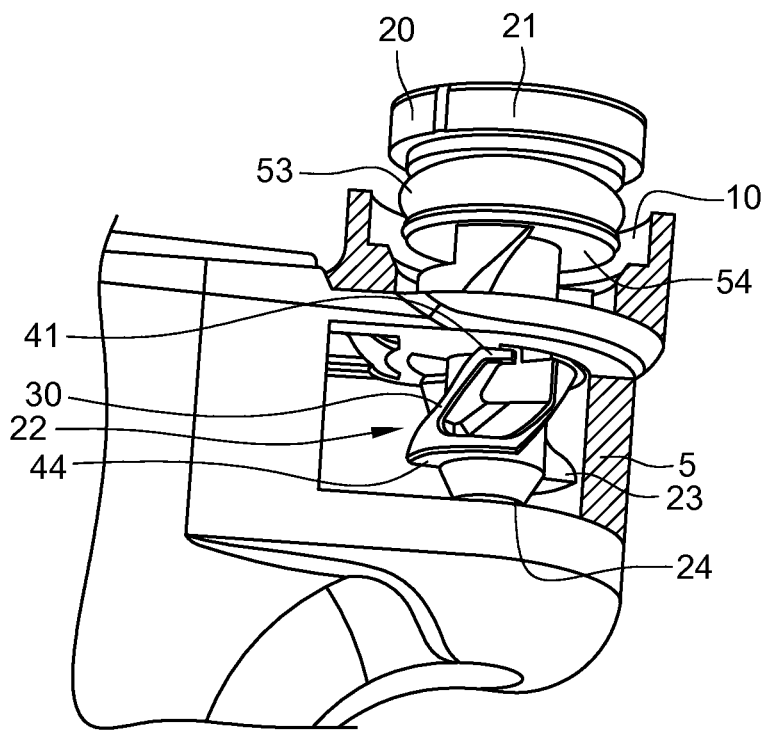

A cap 20 is provided to interact with this header box 2. As illustrated in FIGS. 2 and 3, this cap 20 includes:
a substantially cylindrical head 21,
a shank 22 comprising a plurality of mounting threads 23, this shank 22 being between the head 21 and a free end 24 of the cap 20,
a retaining lug 30 arranged to retain the cap 20 in the opening 10 of the header box 2 in an intermediate position of the cap 20, in which position the cap 20 leaves a clear passage 31 while being retained in the opening 10, this retaining lug 30 being formed on the shank 22, as can be seen more clearly in FIG. 5.

The retaining lug 30 is elastically deformable over a small range of movement, so that it can adopt a retained position and a released position allowing the cap 20 to be moved in the opening 10 when the cap is put in place.

The retaining lug 30 is arranged closer to the free end 24 of the cap than to the head 22.

The retaining lug 30 is arranged on the lower half of the shank, on the side of the free end 24.

Figure 4:
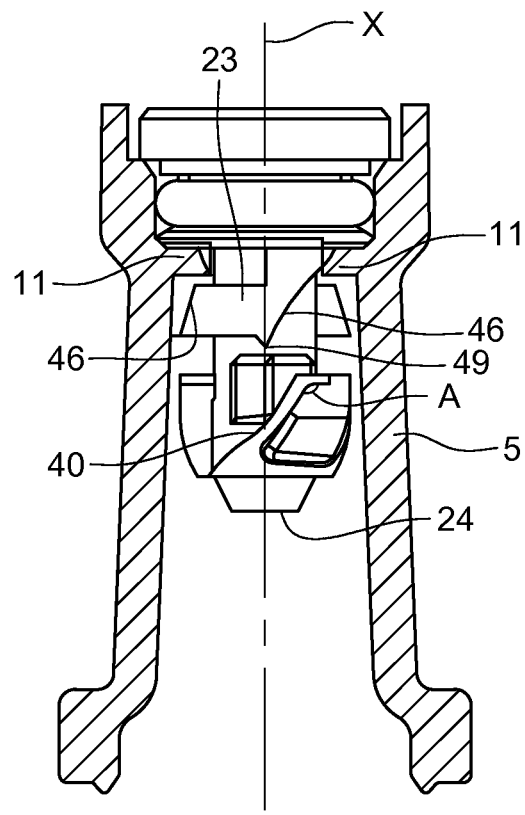
Figure 5:
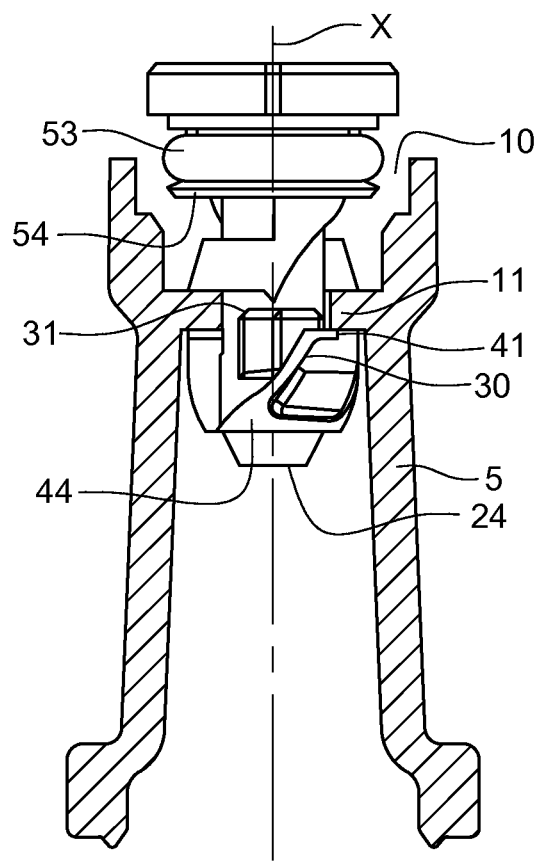

As illustrated in FIGS. 4 and 5 in particular, the cap 20 has a longitudinal axis X, and the retaining lug 30 includes a side wall 40 inclined relative to this longitudinal axis X, in particular at an angle of between 30° and 60°, in particular approximately 45°. This side wall 40 in particular has a helical profile.

The retaining lug 30 includes a bearing flange 41 arranged to press against an axial stop formed by one of the radial protrusions 11 of the opening 10.

The flange 41 is connected to the side wall 40 in particular at an angle A of between 90° and 180°, in particular between 100° and 160°.

The retaining lug 30 is connected to an arc-shaped base 44 of the shank 22.

The retaining lug 30 is adjacent to a thread 23 of the shank.

The retaining lug 30 is integrally formed with the shank 22, in particular by molding.

The retaining lug 30 is singular.

The shank includes a thread 23 situated between the retaining lug 30 and the head 21 when the cap 20 is viewed from the side.

The thread 23 includes a substantially helical side wall 46 arranged to allow the mounting, in particular by a quarter-turn, of the cap in an opening of the header box.

The top thread 23 includes a rotational locking pin 49 arranged to interact with a stop 50 of the header box in order to prevent the cap 20 from rotating when it is in the intermediate position, as illustrated in FIG. 2 in particular.

The locking pin 49 is facing towards the free end 24 of the cap.

The cap 20 includes a seal 53 mounted under the head 21.

The shank includes a retaining plate 54 arranged to accommodate the O-ring 53 between this plate and the head.

The head 21, shank 22 and plate 54 are integrally formed, in particular form a plastic material.

The head 21 includes a slot 59 arranged to receive a screwdriver in order to turn the cap.

The slot 59 has an elongated shape.

FIG. 4 shows, in cross-section, the cap 2 fully inserted into the opening 10, in a sealed manner. The top thread 23 is then underneath the radial protrusions 11, to prevent translation along the axis X.

The seal 53 provides the sealing in the opening 10.

FIG. 5 shows, in cross-section, the cap 20 in an intermediate position, i.e. translated upwards relative to FIG. 4. In this intermediate position, the pin 49 can prevent the cap from rotating. The radial protrusions 11 engaged between bottom threads 23 and top threads 23, with the retaining lug 30 pressing on one of the protrusions 11, makes it possible to retain the cap in the direction of the axis X. Gas can leave the box 2 through the clear passage 31 while keeping the cap securely anchored in the opening 10.

The exchanger can include:
a plurality of tubes 3 in which a heat transfer fluid can circulate,
a plurality of fins 70 arranged between the tubes 3, in particular in contact with these tubes, as can be seen in FIG. 1.

It will thus be seen that the cap 20 can adopt an intermediate position that allows air and/or water and/or gas through.

In this intermediate position, the cap 20 can rotate freely and is held when it is loosened, so that it cannot escape.

The invention claimed is:

1. A cap for a header box of a heat exchanger for a motor vehicle radiator, the cap comprising:
a head;
a shank comprising at least one mounting thread, this shank being between the head and a free end of the cap; and
a retaining lug that is elastically deformable, arranged to retain the cap in an opening of the header box in an intermediate position of the cap, in which position the cap leaves a clear passage while being retained in the opening, this retaining lug being formed on the shank,
wherein the mounting thread includes a rotational locking pin arranged to interact with the header box in order to prevent the cap from rotating when it is in the intermediate position.

2. The cap as claimed in claim 1, in which the retaining lug is elastically deformable so that it can adopt a retained position and a released position allowing the cap be moved in the opening of the header box when the cap is put in place.

3. The cap as claimed in claim 1, in which the cap has a longitudinal axis, and the retaining lug includes a side wall inclined relative to this longitudinal axis at an angle of between 30° and 60°.

4. The cap as claimed in claim 3, in which the lug includes a bearing flange arranged to press against an axial stop of the opening of the header box.

5. The cap as claimed in claim 4, in which the flange is connected to the side wall at an angle of between 90° and 180°.

6. The cap as claimed in claim 4, in which the retaining lug is connected to an arc-shaped base of the shank.

7. The cap as claimed in claim 1, in which the cap includes a thread including a substantially helical side wall arranged to allow the mounting by a quarter-turn, of the cap in an opening of the header box.

8. The cap as claimed in claim 1, in which the rotational locking pin is arranged to interact with a stop of the header box in order to prevent the cap from rotating when it is in the intermediate position.

9. The cap as claimed in claim 1, in which the head includes a slot arranged to receive a screwdriver in order to turn the cap.

10. The cap as claimed in claim 1, wherein the retaining lug is between the shank and the free end of the cap.

11. A heat exchanger comprising:
a header box provided with an opening; and
a cap mounted in the opening, the cap comprising:
   a head;
   a shank comprising at least one mounting thread, this shank being between the head and a free end of the cap; and
   a retaining lug that is elastically deformable, arranged to retain the cap in an opening of the header box in an intermediate position of the cap, in which position the cap leaves a clear passage while being retained in the opening, this retaining lug being formed on the shank,
wherein the mounting thread includes a rotational locking pin arranged to interact with the header box in order to prevent the cap from rotating when it is in the intermediate position.

* * * * *